2,946,722

COMPOSITION AND METHOD FOR TREATING POULTRY

Walter H. Hoffman, 24 Crestview Drive, and Waitman P. Scott, 2353 S. Maryland, both of Springfield, Mo.

No Drawing. Filed July 21, 1959, Ser. No. 828,444

8 Claims. (Cl. 167—53.1)

The present invention relates to a composition and method for treating poultry and, more particularly, to a composition and method for promoting better poultry growth response in both healthy flocks and in flocks apparently suffering from nonspecific diseases.

The invention also relates to a free-choice composition and method for treating poultry and, more particularly, to a composition and method whereby fowls may treat themselves to thereby provide better and more uniform growth response.

Many diseases in poultry flocks are readily identified as being caused by a specific organism. They respond to specific treatments, or may be controlled by vaccination. Other poultry diseases, hereinafter designated as "nonspecific diseases," are those whose symptoms and causes are not easily recognized and are not readily and seldom positively diagnosed. Many conflicting symptoms and indications may be present. Such diseases include CRD (air-sac infection), enteritis, anemia, gizzard erosion, blue comb and mud fever in turkeys, epidemic tremor, and hemorrhagic disease. The recent widespread use of antibiotics in poultry treatment while extremely valuable, has not proved to be the complete answer to all poultry problems. Thus, in spite of antibiotics, the nonspecific diseases still persist and cause serious mortality and weight losses to the poultry raiser. Likewise, while the use of vitamin and mineral supplements as additions to poultry feeds is now common practice, flocks on occasion still exhibit symptoms of nutritional deficiencies, hemorrhagic diseases, anemia, and the like. It is believed that the nonspecific diseases in many instances, may be at least in part due to the presence of infectious molds or fungi, and the composition of the present invention includes materials designed to provide control of such molds.

An object of the invention is to provide a composition and method for treating poultry to improve the rate of growth, promote smoother feathering, and better the general vitality of the growing chick.

A further object of the invention is to provide a balanced poultry composition for combatting adverse blood and growth conditions accompanying nonspecific infections.

Another object of the present invention is to provide an improved composition and method for free-choice treatment of poultry flocks.

Another object of the invention is to provide a novel combination of ingredients which acts in a more effective manner with respect to treatment of nonspecific diseases and improvement in growth response in poultry than could be expected from a knowledge of the individual components of such composition.

A further object of the invention is to provide a far more convenient, economical and even profitable method of treating poultry flocks for control of nonspecific diseases than heretofore known.

Another object of the invention is to provide a new synergistic and automatic method for selectively dispensing individual treatment within a poultry flock.

Another object of the invention is to provide continuous control of varied and nonspecific disease-causing organisms and bacterial abnormalities caused from stress by preserving a higher flock health level and to increase growth and feed efficiency by promoting better and more consistent utilization of all feed nutrients.

Another object of the invention is to effect savings and provide a self-selective method for improving the health of poultry flocks, thereby eliminating many management problems and need for veterinarian services, laboratory analyses, and poultry disease specialists.

It has now been found that sodium propionate, when properly used, apparently constitutes an effective antifungal and antibacterial agent for the prevention and control of certain microorganisms which seem to be almost always present in poultry or in poultry-raising environments. While sodium propionate is effective in combatting harmful bacteria and fungi when used alone, and is effectively administered by being incorporated in the poultry diet in an amount of from about 0.1 to about 2%, or in the same concentration as an addition to the poultry drinking water, it has been found that far more beneficial effects are obtained by combining sodium propionate with certain other medicaments and growth-promoting agents.

When sodium propionate is used alone, it will effectively combat certain fungal and bacterial growth, but in some instances after the course of treatment, the fowl do not immediately show a desired rate of growth response and may be receptive to other ailments. Fowl weakened by infections and by the stresses set up during medication, require optimum conditions both with respect to blood and diet, in order rapidly to regain their normal growth rate and general health. It has now been determined that if sodium propionate is combined with ferric choline citrate, preferably along with menadione (vitamin K) and supplementary trace elements, such as copper, zinc, cobalt, and the like, the stresses set up during the period of infection and medication are effectively counterbalanced. Ferric choline citrate is highly effective in restoring blood iron levels and in raising hemoglobin levels. The menadione provides a valuable aid in combatting the alteration in the blood conditions during the critical period, and in combination with sodium propionate seems more effective in reducing hemorrhagic symptoms than if used alone.

It has further been found that the action of sodium propionate in combatting fungal and bacterial infections is beneficially complemented by the use of methyl rosaniline, to provide a higher degree of effectiveness against a broader spectrum of harmful microorganisms. Methyl rosaniline is used in much smaller quantities than the sodium propionate and, in general, an amount of not more than about 1.0% with respect to the sodium propionate is sufficient. Unexpectedly, it has been determined that sodium propionate and methyl rosaniline, when used in combination with the other ingredients specified herein, are effective to reduce the growth of undesirable microorganisms without materially reducing the growth of and activity of the normal coliform bacteria present in the intestinal tract, which are necessary in synthesizing important nutritional factors.

The combination of sodium propionate, methyl rosaniline, ferric choline citrate, menadione, and trace elements, provides a varied coverage of antibacterial, antifungal, antihemorrhagic, and stress-compensating anti-anemic, factors in a well-balanced formula. Thus, while the bacterial medication is taking place, anemia or hemorrhagic conditions that might adversely affect recovery are prevented by the ferric choline citrate and viamin K. After the infection has been remedied, the fowl are stimulated into new growth under the most optimum conditions.

In certain instances where high-salt feed is used or where the drinking water contains a high-salt level, high-level use of sodium propionate may have some tendency to set up a sodium stress in the treated poultry. Accordingly, it is preferred to balance the sodium compound treating composition with a potassium compound, providing an amount of potassium generally equivalent to the sodium content of the sodium propionate.

While it is to be understood that the proportions of ingredients in the composition of the invention may be varied widely without complete loss of effectiveness, the composition may comprise from about 20 to 50% sodium propionate, and equivalent amount of a potassium salt, 0.1 to 0.5% methyl rosaniline, 0.1 to 0.5% menadione, 5 to 25% ferric choline citrate, and 1 to 15% of trace element compounds. The composition may further include from 5 to 50% of an inert carrier material, or in the event that it is to be added to drinking water, may include pH control agents, such as citric acid, etc., in an amount of from about 1 to 20%. The following illustrative formulas have been found most satisfactory:

EXAMPLE 1

| Ingredients | Per 100 Lbs. Weight (Approx.) |
|---|---|
| | Lbs. |
| Copper sulfate | 8 |
| Sodium propionate | 30 |
| Potassium chloride | 20 |
| Zinc sulfate | 0.5 |
| Gentian violet (methyl rosaniline) | 0.25 |
| Menadione sodium bisulfite (vitamin K) | 0.17 |
| Ferric choline citrate | 12 |
| Flavoring oil | 0.10 |
| Cobalt sulfate | 0.05 |
| Potassium iodide | 0.075 |
| Manganese sulfate | 1.265 |
| Silene (ppt. and hydrated calcium silicate) | 25.625 |
| Magnesium sulfate | 0.01 |

EXAMPLE 2

| | |
|---|---|
| Sodium propionate | 38.25 |
| Copper sulfate (Monohydrate) | 9.06 |
| Zinc sulfate | 0.638 |
| Cobalt sulfate | 0.064 |
| Potassium iodide | 0.088 |
| Manganese sulfate | 1.61 |
| Menadione sodium bisulfite (vitamin K) | 0.216 |
| Ferric choline citrate | 15.3 |
| Gentian violet | 0.338 |
| Citric acid | 14.444 |
| Potassium chloride | 25.5 |
| Magnesium sulfate | 0.01 |

The product of Example 1 differs from that of Example 2 primarily in that it includes an inert diluent (Silene) and is adapted to be used as a dry supplement in feeds and the like, whereas the product of Example 2 includes citric acid to control pH, is all water-soluble, and can be used as an additive to drinking water or as a dry feed supplement. Either product may be used in an amount sufficient to supply a concentration of from about 0.1 to 1.0% of sodium propionate in the feed or water, as the case may be. A suitable stock solution may be made by mixing 1.6 lbs. of the soluble form of the product of the invention in one gallon of water.

For regular level administration to poultry for preventive effect and for remedy of infections in early stages, about one-half pound of the product of Example 1 may be added to and thoroughly mixed with each 100 pounds of poultry feed. This provides a feed containing 0.15% of sodium propionate, 0.06% of ferric choline citrate, and relatively small but effective amounts of menadione and methyl rosaniline. Such a ration may, for example, be fed to poultry for the first two weeks after leaving the hatchery and may then be discontinued and repeated for a week when the birds are about 5½ to 6 weeks of age. Alternatively, the water-soluble composition of Example 2 may be added to the drinking water for the first two weeks at the rate of about one ounce of the stock solution containing such composition for each gallon of water and may then be again added to drinking water after 5½ weeks or so. If desired, the treatment at regular level may be applied continuously.

For higher level administration, after disease has become more evident, one pound of the product of Example 1 may be added to each 100 lbs. of feed for a period of about 5 days, or alternatively, 2 ozs. of stock solution per gallon of the product of Example 2 can be added to the drinking water. Larger quantities may be used in extreme cases. Treatment may be continued from time to time as necessary, or reduced to the regular level.

EXAMPLE 3

Tests were carried out on a number of chicks from the same hatchery lot in 500 chick pens containing the same number of males and females and treated under the same conditions. All of the chicks were fed the same basal diet, except that the diet fed to the birds in one pen was supplemented by the addition of 5 pounds of the product of the present invention per ton. Results after nine weeks and three days were as follows:

| Pen No. | No. of Birds | Treatment | Avg. Weight | Ratio, Feed/Wt. | Percent Mortality |
|---|---|---|---|---|---|
| 1 | 500 | Basal | 2.90 | 2.60 | 4.40 |
| 2 | 500 | Basal + 5 lbs./ton of product. | 3.07 | 2.43 | 3.69 |

It will be seen that the addition of the product of the invention materially reduced the mortality rate, provided increased average weight, and resulted in more efficient feed conversion. Examination of the live birds indicated that the treatment tended to improve fleshing, finish, feathering and pigmentation.

EXAMPLE 4

Tests were set up in a broiler house divided into a plurality of sections. In one section, 4-week-old chicks were fed with a commercial mash, and in another section chicks of the same lot were fed with the same mash mixed with 1% of the product of the invention. After one week, 100 chicks from each section were selected at random and were weighed. Again, after a two weeks' period, the same number of chicks were selected at random and weighed. The results are given in the following table:

*One hundred four-week-old mixed sexes*

| Week | Av. Wt. Control (lbs.) | Av. Wt. Treated (lbs.) | Av. Wt. Diff. (lbs.) |
|---|---|---|---|
| 1 | 1.147 | 1.194 | .047 |
| 2 | 1.442 | 1.511 | .069 |

It will be seen that the treated chicks outgained the control group by a very substantial amount.

EXAMPLE 5

Another test was conducted on 5-week-old chicks of the same lot in different sections in the same broiler house. These chicks were all fed the same commercial mash. The drinking watch of the chicks in one section was mixed with the water-soluble product of the invention at the rate of ½ ounce per gallon. Forty chicks from each lot were selected at random and weighed at the end of one- and two-week periods. The results are given in the following table.

*Forty five-week-old mixed sexes*

| Week | Av. Wt. Control (lbs.) | Av. Wt. Treated (lbs.) | Av. Wt. Diff. (lbs.) |
| --- | --- | --- | --- |
| 1 | 1.725 | 1.830 | .105 |
| 2 | 2.060 | 2.376 | .316 |

Here again, the treated chicks showed a substantially greater weight gain.

EXAMPLE 6

A test was conducted on 9-week-old pullets from the same lot in different sections of the same house. In this instance, the product of the invention was incorporated in the feed of the pullets in one section at the rate of 1% by weight. After one week, 32 pullets from each section were selected at random and were weighed with the following results:

*Thirty-two nine-week-old pullets*

| Week | Av. Wt. Control (lbs.) | Av. Wt. Treated (lbs.) | Av. Wt. Diff. (lbs.) |
| --- | --- | --- | --- |
| 1 | 2.718 | 2.806 | .088 |

It will be observed that in each of the tests of Examples 3 through 6 there was a substantial weight gain in the chicks treated with the composition of the present invention. It will be apparent that treatment of the chicks in the manner indicated results in material extra profits for the poultry raiser. In addition, the chicks in the treated sections exhibited a better general vitality and showed no symptoms of disease.

EXAMPLE VII

A test was conducted on two duplicate batteries of 18 Columbian X White Leghorn day-old chicks. The birds were reared in electrically heated battery-brooders with raised wire floors. The chicks in each battery were fed a corn-soybean oil meal type of basal diet, except that the basal diet of one duplicate section was incorporated with 1% of the product of the present invention. The birds were weighed weekly in groups up to the fourth week, at which time they were weighed individually, and weights and feed consumption were recorded. The blood-clotting time was determined at the termination of the experiment by the capillary method at 25° C. on blood samples obtained by venipuncture. Bacteriological analyses were carried out on various sections of the intestinal tract of the birds sacrificed at the end of the experiment, and the presence and extent of subcutaneous and intramuscular hemorrhages were determined. The ingredients of the basal ration are set forth below:

| Ingredients | lb./100 lb. |
| --- | --- |
| Ground yellow corn | 64.5 |
| Soybean oil meal (50% protein) | 32.0 |
| Steamed bone meal | 2.0 |
| Ground limestone | 1.0 |
| Iodized salt | 0.5 |

| | gm./100 lb. |
| --- | --- |
| Manganese sulfate (feed grade) | 11.4 |
| Vitamin A oil (10,000 I.U./gm.) | 22.7 |
| Dry vitamin D-3 (1,650 I.C.U./gm.) | 22.7 |
| Riboflavin | 0.15 |
| Vitamin B-12 (3 mg./lb.) | 45.4 |
| Niacin | 1.0 |

The effect of the product of the invention on chick growth, blood-clotting time, and severity index of hemorrhagic syndrome is given in the following table:

*Results at 4 weeks of age*

| Diet | Test | Av. Wt. (grams) | No. Birds Surviving | Ratio, Feed/Gain | Av. Clotting Time (min.) | Hemorrhagic Plus Severity Index, Percent |
| --- | --- | --- | --- | --- | --- | --- |
| Basal | $R_1$ | 367.2 | (18) | 2.10 | 14.6 | 38.2 |
| | $R_2$ | 354.4 | (17) | 2.14 | 13.2 | 34.6 |
| | Av. | 360.8 | (35) | 2.12 | 13.9 | 36.4 |
| Basal + 1% of Product | $R_1$ | 487.2 | (18) | 1.82 | 9.6 | 21.6 |
| | $R_2$ | 468.4 | (18) | 1.91 | 10.2 | 19.8 |
| | Av. | 477.8 | (36) | 1.86 | 9.9 | 20.7 |

$$\text{Hemorrhagic severity index} = \frac{\text{Total score}}{\text{No. of birds} \times 4} \times 100$$

From the foregoing table it will be observed that the presence of the product of the invention in the diet caused a significant increase in growth response. The increases were accompanied by improved efficiency of food utilization; the blood-clotting time of the birds on the diet receiving 1% of the product was reduced a very significant amount. The hemorrhagic severity index was derived by assigning a score of from 0 to 4 to each bird, depending on the number and extent of hemorrhages after they had been sacrificed and skinned. It will be observed that the birds fed the diet containing the product of the invention showed a noticeable reduction in hemorrhagic severity index.

From the bacterial analysis of the sacrificed birds it was found that the number of lactobacilli and enterococci were reduced in all sections of the intestinal tract by the addition of the product of the invention to the diet. However, in the case of coliform organisms, there was only a slight reduction in the cecal coliforms.

A further embodiment of the invention comprises the free-choice composition and method for better administration of the ingredients of the composition to the birds needing treatment and with improved results.

In commercial poultry operations, birds (both chickens and turkeys) are produced in flocks of great numbers. Heretofore, individual treatment for disease has been impossible except by use of injected materials or manually administered tablets or capsules, which cause handling stress and considerable labor cost. It is seldom, if ever, that the more common disease conditions, such as hemorraghic anemia, diarrhea, blue comb, mud fever, mycosis, or chronic respiratory disease affect large numbers of birds simultaneously. Each disease entity generally results in some small numbers of birds in the house or on the range showing some degree of debilitation. In the day and weeks which follow, with one or more of these conditions present in some portion of the flock, debilitation slowly but progressively affects these flock members while more and more of the birds in the flock become progressively affected. This slowly progressing disease process has presented an unanswerable problem in medication, since it is often impractical and uneconomically feasible to treat the entire flock in order to stop the disease process in the few birds which primarily develop these disease difficulties. Yet if the conditions are allowed to progress in the flock so that the number affected makes it feasible to administer flock medication, those birds primarily developing the difficulties are so far debilitated as to have caused severe economic loss due to mortality, poor grade, and poor feed utilization during the period of debilitation.

Since the medicinal combinations available for use under previously known methods of application are effective only when used in repeated and costly periods of application through normal feed and drinking water intake, and such application must depend on the ability and knowledge of disease and its associated problems on the part of mostly unskilled labor, the cost of such medications has been unnecessarily high.

It has now been found that by combining the ingredients of the composition previously disclosed in a product known in the art as a "milk-base food block," and placing such product before the poultry for free-choice consumption, there is provided a much more economical and convenient means for treating the flock. Moreover, unexpectedly, the ingredients of the composition, at least in part, appear to act in a synergistic manner with the milk solids to provide a more effective remedy than could be realized with their combination in other nutrients or in water. The "milk-base food blocks" referred to are conventionally produced of a combination of milk, fish meal, soybean meal, meat meal and other food solids or milk by-product solids to provide a soft, cheese-like product in block form.

In accordance with this form of the invention, the novel therapeutic composition is prepared by incorporating homogeneously throughout a soft, milk-base food block about 1 to 4% of a mixture of the following ingredients in substantially the percentages set forth:

| | Percent |
|---|---|
| Water-soluble propionate (Na or K) | 20 to 50 |
| Menadione sodium bisulfite | 0.1 to 0.5 |
| Ferric choline citrate | 5 to 15 |
| Methyl rosaniline | 0.1 to 0.5 |
| Copper sulfate and other trace elements | 1 to 15 |

Where sodium propionate is used in the foregoing formula, a potassium salt such as potassium chloride is included in an amount providing potassium equivalent to the sodium.

The homogeneous dispersion of these ingredients in the milk-foods block is best accomplished by thoroughly mixing them and then incorporating the mixture into the food block during its process of manufacture. The resultant product is a soft, moist, semi-solid material which may be made available in standard sizes, such as 10-, 25-, or 50-pound blocks.

Copper and iron salts together in the proper levels appear to act synergistically with the milk solids to provide unexpectedly good disease control and growth promotion. These salts are also valuable in contributing to the overall effectiveness of the other therapeutic ingredients. Such salts should be incorporated in amounts such as to provide about 0.1 to about 2% copper and from about 0.01 to about 0.1% iron in the milk-base block. The iron and the copper salts may, for example, be in the form of their sulfates, chlorides, acetates, citrates, lactates, etc. Thus, in lieu of ferric choline citrate, the iron can be added as ferric ammonium citrate, ferric ammonium sulfate, ferric tartrate, ferric chloride, ferric phosphate, and the like. However, ferric choline citrate is the preferred form of iron and provides the best results. None of the other ingredients of the overall therapeutic composition utilized alone with the milk and other solids or in any combination, provides results equivalent to those obtained with the combination of iron and copper salts. However, more complete disease control and growth stimulation are realized when all of the aforementioned ingredients are utilized together, along with the milk-foods solids in soft, cheese-like form.

The process for treating the fowl comprises setting the medicated block in the poultry house before the poultry, in addition to the normal diet and water fed to such poultry. It has been found that poultry, such as chickens and turkeys, develop peculiar habits when beset by certain diseases, such as hemorrhagic anemia, enteritis, diarrhea, blue comb, mud fever, mycosis and chronic respiratory disease. There is a slowly developing tendency to pick at one another, at litter, paper, grit, nails, feathers or any other hard or fibrous material available in the poultry house when any of these conditions are present in these birds. When the medicated food block is set before a flock, it appears that the affected birds are led to pick at such block rather than other available materials whereby, in effect, they selectively consume the effective treating agents. It is for this reason that the composition and the process of this embodiment of the present invention is termed "free-choice" treatment.

Milk products usually set before a flock are of white or very light color, except when artificially colored. The ingredients of the therapeutic composition incorporated with such milk products according to this invention, impart to the foods block a very dark, almost black color. It is generally considered that a dark-colored, medicated material is less attractive to the fowl than are lighter colored materials. Therefore, acceptance of the dark-colored material by the diseased fowl is further proof that a "nature directed" tendency to self-preservation has been discovered and utilized. By maintaining the medicated milk blocks before the flocks at all times, medication is available whenever needed, thereby enabling it to be either ignored or ingested, as the needs of the fowl may dictate. It is thereby possible to keep the medication constantly available throughout known stress periods at a cost far lower than that which could be realized if the medicaments were continuously supplied with feed or water. Effective control of disease in poultry flocks may be realized in this manner with economically feasible amounts of the therapeutic ingredients. Thus, protection against nonspecific diseases, on a program basis, may be obtained with about ten pounds per thousand birds when the therapeutic composition is supplied periodically in the feed or water. It has now been found that a supply of about 4 pounds of the same therapeutic ingredients per thousand birds, when such ingredients are incorporated in a soft foods block, is more effective than the ten pounds of the feed. It is believed that the effective control with lesser amounts of therapeutic ingredients is due in part to some synergistic action between the therapeutic ingredients and the milk solids part of the block. Milk solids alone do nothing to control disease, except to the extent that better nutrition in any form will contribute to higher resistance on the part of the flock and thereby delay, but not prevent the resultant onslaught of disease possibly a few days beyond the time of the control flocks under the same conditions but without the milk, would come down with it more quickly.

The present system of poultry treatment offers a remarkably low-cost method of disease control and growth stimulation. Administration of the treatment in soft, milk-foods products carriers can be accomplished at a total cost of approximately 2¢ per bird. Measured by common standards, ten points gain on the bird (0.10 lb.), with the broiler market at 20¢ lb. will pay for the medication. Likewise, a 20-point reduction in feed efficiency (0.02), with feed at $5.00 per hundredweight, will pay the entire cost, while any combination, as for example, a ten-point reduction in feed efficiency combined with a five-point extra weight gain, will pay for the program. Under present field conditions, such minor differences are easily achieved with the product of the invention. In the meantime, valuable savings in labor, time, medical services, and the like are being realized. However, all of the tests so far conducted on the presently disclosed method of medication indicate a much wider spread than that required to cover cost at the production level. Thus, actual cash returns are realized in addition to all of the other savings and conveniences.

This embodiment of the invention is further exemplified by the following examples of practice:

EXAMPLE 8

A batch of milk by-products from a milk-processing plant (cheese whey and buttermilk), is run into a large tank and dried to congealing consistency (when cooled), by evaporation under vacuum in the range of 15 to 28 inches at a temperature in the range of 100 to 180° F. (Fish products, meat meal, brewers' yeast, and other food additives may be added before or during the drying process.) If desired, atmospheric drying may be utilized, but longer times are required. The drying time is determined by the moisture content desired, the degree of vacuum used, and by the degree of temperature applied. Thus, the time may vary from approximately six hours with the vacuum method to as much as four or five days, or a week, with atmospheric drying. Water is removed to a point where, in cooling in a mold, the milk by-product composition will retain the shape of the mold and remain in such shape after the mold has been removed to enable it to be handled and moved in feeding programs. The molded and cooled product is preferably a soft, cheese-like consistency. The composition in the tank, while still hot and fluid is poured into shipping cartons which may be of such size as to provide blocks of standard weight, e.g., 50 pounds. Pouring preferably takes place at the lowest pour temperature of the material in the tank. Just prior to the time of pouring, the therapeutic ingredients are added. Thus, to a batch of milk by-product sufficient to produce one ton of molded products, 40 pounds of a mixture of therapeutic ingredients, i.e., 2%, are added to the tank and thoroughly mixed with the mass therein. If desired, vitamins may be added at the same time. It will be understood that the therapeutic ingredients can be added at any point during the drying process, or before the drying begins. The preferred time of addition, just before pouring, reduces the danger of any loss or decomposition of the therapeutic ingredients due to prolonged heat and moisture conditions prevailing during the period of evaporation.

After the mass is poured into the cartons, it is permitted to set and is then ready and packaged for distribution. The time required for setting is variable, depending upon the consistency to which the primary materials have been reduced by the evaporating process. The setting time may range from six hours to one week.

A convenient manner of incorporating the therapeutic ingredients in the mass comprises pre-mixing them in water solution, or with some of the original whey or other by-product milk liquid utilized to form the milk-foods by-products block. The solution so obtained is then added to the entire batch at a point just prior to the end of the drying operation.

It will be understood that the foregoing does not constitute the only maner by which the therapeutic ingredients may be added to the by-product milk materials. For example, the whey, buttermilk, or other milk by-product may be converted to cheese-like consistency by any desired method, after which it can be re-ground, mixed with the therapeutic ingredients, and re-formed into a block of the desired size. In such operation, it is usually necessary to add back some slight degree of moisture after grinding to permit the mass to re-congeal. If desired, pectin, algin, or other materials which promote a gel may be utilized to promote better congealing of the materials used. It is also possible to alter the consistency and softness of the block by the addition of certain glycols or related materials which tend to retain a moist texture in the block. Since the preparation of cheese-like forms of milk by-products is well known to those in the art, further details of this operation will not be set forth herein.

EXAMPLE 9

Two percent by weight of a therapeutic mixture of the formula set forth below were incorporated in a soft milk-base block in the manner set forth above in Example 8.

| Ingredients | Per 100 lbs. Weight (Approx.) |
|---|---|
| | Lbs. |
| Copper sulfate | 8 |
| Sodium propionate | 30 |
| Potassium chloride | 20 |
| Zinc sulfate | 0.5 |
| Gentian violet (methyl rosaniline) | 0.25 |
| Menadione sodium bisulfite (vitamin K) | 0.17 |
| Ferric choline citrate | 12 |
| Flavoring oil | 0.10 |
| Cobalt sulfate | 0.05 |
| Potassium iodide | 0.075 |
| Manganese sulfate | 1.265 |
| Silene (ppt. and hydrated calcium silicate, as inert diluent) | 25.625 |
| Magnesium sulfate | 0.01 |

Of the ingredients listed, only the salts of iron and copper, the sodium propionate, gentian violet, menadione sodium bisulfite and potassium chloride are regarded as essential for the purposes of the invention, although the zinc, cobalt, manganese, and magnesium salts as well as the iodide, provide valuable trace element components.

The resulting mixture was molded into the form of 50-pound blocks and utilized in a broiler treating test. After ten weeks, it was found that the chicks to which the medicated block had been made available had an average weight of 3.07 pounds at a feed conversion ratio of 2.29, whereas the chicks in a control pen reared under similar conditions except for the medicated block, had an average weight of 2.96 pounds at a feed conversion ratio of 2.37. It will be seen that the chicks having the medicated block available to them produced a 19-point spread over the control chicks, thereby providing a substantially profitable return over the cost of medication. The only effort involved in the treatment comprised placing the blocks in the broiler house at the time the chicks were obtained. The medicated chicks showed no signs of stress or other evidence of nonspecific disease, and were well feathered and fleshed, while the control chicks developed enteritis and a slight respiratory infection.

The system of free-choice medication has proved to be practical, acceptable to the birds, and effective for disease control. It offers the most economical and most effective known method for making medication available on a selective basis to those birds most in need, as the need arises from bird to bird throughout the flock so treated. Timing, being all important in disease control, is controlled by the individual bird and the system thus provides individual treatment within the group or flock. The selective, individually self-administered method of medication eliminates the limiting variables inherent to and inseparable from man-applied medication measures. Thus, the free-choice system promotes much greater uniformity in the flock, better quality, better grade, better pigmentation and feathering, as well as better general flock health.

The free-choice system has especial value in modern-day operations because it offers compensation for other limiting but necessary practices. For example, it is practically impossible to apply medications exactly when needed when the feeding program is on a bulk delivery basis. The bins are often full of feed when the medication application may appear advisable. Bin deliveries are necessarily planned to provide the quantities necessary for carry-over to the next normal delivery date, or all the advantages of bulk delivery are lost. If planned deliveries are interupted by delivery of medicated feeds in sacks, then much feed may remain in the bins at finish time and must be removed at some cost before another flock is placed in the facilities. The free-choice system eliminates this problem.

Water medications are likewise a problem. In the first place, such soluble applications are far more costly, even as much as three times as costly as feed application in the same degree. It is necessary to provide automatic dispensing equipment or to devote considerable labor time to the proper and effective dispensing of water-soluble medications. The free-choice system offers avoidance of timing problems, both in water and feed application problems.

The product of the invention is beneficial to growing birds of all ages—including chickens, turkeys and other fowl—and, moreover, is useful in stimulating sluggish and unprofitable layers. It may be combined with antibiotics and has been found to greatly improve their effectiveness. It is far less costly than antibiotics, and microorganisms which have built up a resistance to antibiotics through continued use are often controlled by use of the present product.

This application is a continuation-in-part of our copending application Ser. No. 675,265, filed July 31, 1957, now forfeited and of our copending application Ser. No. 745,811, filed July 1, 1958, now abandoned.

We claim:

1. A composition for poultry treatment consisting essentially of a nontoxic water-soluble salt of propionic acid and lesser but complementary quantities of methyl rosaniline, ferric choline citrate, menadione sodium bisulfite, and trace-element compounds.

2. A composition for poultry treatment consisting essentially of a nontoxic water-soluble salt of propionic acid, methyl rosaniline, ferric choline citrate, menadione sodium bisulfite, and trace-element compounds including compounds of copper, cobalt, manganese, magnesium, zinc, and iodine.

3. A composition for poultry treatment containing the following ingredients in the ratio of the approximate percentages by weight set forth: sodium propionate, 20 to 50%; menadione sodium bisulfite, 0.1 to 0.5%; ferric choline citrate, 5 to 15%; methyl rosaniline, 0.1 to 0.5%; and copper sulfate at least about 8%.

4. The composition of claim 3 including a potassium compound in an amount providing a quantity of potassium approximately equivalent to the sodium content of the sodium propionate.

5. The composition of claim 3 wherein all of the ingredients are water-soluble and from about 1 to 20% of citric acid is included.

6. A poultry feed comprising a basal ration containing about 0.5 to 2.0% of a composition containing the following ingredients in the approximate percentages by weight set forth: sodium propionate, 20 to 50%; menadione sodium bisulfite, 0.1 to 0.5%; ferric choline citrate, 5 to 15%; methyl rosaniline, 0.1 to 0.5%; and copper sulfate, at least about 8%.

7. A product for the free-choice treatment of poultry, comprising: a soft, milk-base food block having homogeneously incorporated therein a nontoxic water-soluble salt of propionic acid and lesser but complementary quantities of methyl rosaniline, ferric choline citrate, menadione sodium bisulfite, and trace-element compounds.

8. A product for the free-choice treatment of poultry, comprising: a soft, milk-base food block having homogeneously incorporated therein from about 1 to about 4% of a therapeutic composition having as essential ingredients thereof the following: sodium propionate, 20 to 50%; menadione sodium bisulfite, 0.1 to 0.5%; ferric choline citrate, 5 to 15%; methyl rosaniline, 0.1 to 0.5%; copper sulfate, 1 to 15%, and potassium chloride 10 to 35%.

References Cited in the file of this patent

UNITED STATES PATENTS

| | | |
|---|---|---|
| 2,575,611 | Bandelin | Nov. 20, 1951 |
| 2,856,328 | Terry | Oct. 14, 1958 |

OTHER REFERENCES

U.S. Disp., 24th ed., 1947, pp. 665, 666, 710 and 711, Lippincott Co., Phila., Pa.

Wright: Arch. Biochem., vol. 10, 1946, pp. 383–386.

Dorello: C. A., vol. 47, 1953, pp. 2274i and 2275a.

U.S. Disp., 25th ed., 1955, pp. 1964, 2018, 1991, 1994, 1966, 1098, 1099.